United States Patent [19]
Donelly

[11] Patent Number: 5,940,541
[45] Date of Patent: Aug. 17, 1999

[54] DIGITAL HALFTONING OF A CONTINUOUS TONE IMAGE USING ERROR DIFFUSION

[75] Inventor: Ross Alexander Donelly, West Ryde, Australia

[73] Assignee: Canon Kabushiki Kaisha, Tokyo, Japan

[21] Appl. No.: 08/597,676

[22] Filed: Feb. 6, 1996

[30] Foreign Application Priority Data

Feb. 9, 1995 [AU] Australia .................................. PN0988

[51] Int. Cl.$^6$ .................................................. G06T 5/00
[52] U.S. Cl. .......................................... 382/252; 382/237
[58] Field of Search .................................. 395/109, 113; 382/252, 237, 270, 282; 348/701, 620, 452, 458

[56] References Cited

U.S. PATENT DOCUMENTS

| | | | |
|---|---|---|---|
| 5,068,644 | 11/1991 | Batson et al. | 340/701 |
| 5,070,413 | 12/1991 | Sullivan et al. | 358/456 |
| 5,113,455 | 5/1992 | Scott | 382/298 |
| 5,337,160 | 8/1994 | Jones | 358/447 |
| 5,416,613 | 5/1995 | Rolleston et al. | 358/518 |
| 5,570,461 | 10/1996 | Yokomizo | 395/133 |

OTHER PUBLICATIONS

"An Adaptive Algorithm For Spatial Gray Scale", R. Floyd et al., Society For Information Display 1975 Symposium Digest of Technical Papers, 1975, pp. 36–37.

"Digital Halftoning", R. Ulichney, 1991, MIT Press.

"Color Image Quantization For Frame Buffer Display", P. Heckbert, Computer Graphics, vol. 16, No. 3, Jul. 1982, pp. 297–304.

IBM Technical Disclosure Bulletin, vol. 29, No. 3, Aug. 1986, pp. 1329–1334.

*Primary Examiner*—Thomas D. Lee
*Assistant Examiner*—Stephen Brinich
*Attorney, Agent, or Firm*—Fitzpatrick, Cella, Harper & Scinto

[57] ABSTRACT

The present invention provides a method and apparatus for error diffusing a series of images, each of said images being made up of component pixels. The method comprises, for each of said pixels determining a current error diffused value for said pixel; adding an error margin to each current error diffused value to produce a marginalised error diffused value, said marginalised error diffused value being a translation of said current error diffused value in a direction towards that of a previous output value for said pixel; utilising said marginalised error diffused value to determine a closest possible output value to said marginalised error diffused value; and error diffusing the difference between said closest possible output value and said error diffused value to adjacent pixels.

10 Claims, 11 Drawing Sheets

DIGITAL HALFTONING OF A CONTINUOUS TONE IMAGE USING ERROR DIFFUSION

FIELD OF THE INVENTION

The present invention relates to the field of digital image processing and more particularly to a method for digital halftoning continuous tone images using error diffusion.

BACKGROUND OF THE INVENTION

Digital halftoning is a technique employing digital image processing to produce a halftone output image from a continuous tone input image. In the digital colour image halftoning technique, a continuous tone colour image is sampled, for example with a scanner, the samples are then digitised and stored in a computer device. In a full colour system, the digitised samples or pixels can consist of independent binary representation of the colour components of an image. For example, in the well known red, green and blue system (RGB), utilised in most output displays, the digitised samples or pixels consist of three binary representations of the red, green and blue scanned colour values respectively. These binary representations typically range from 0 to 255 for each colour, thereby comprising 8 bits for each colour or 24 bits to represent one pixel.

Figure 1:
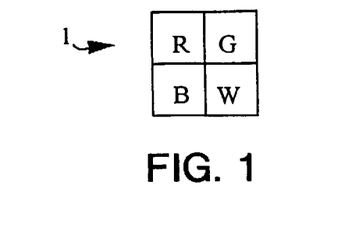
FIG. 1 illustrates an example pixel layout suitable for use with both the prior art and the preferred embodiment.

Standard CRT type display devices are able to display each pixel with a large number of variations of each colour component of the pixel. Hence, the desirability of storing 256 possible values for each colour component of each pixel of a CRT type display. Other output devices, such as printers and certain display devices such as ferro electric liquid crystal displays are often designed to only be able to display a limited number of colours or intensity values for each output colour. Hence, when displaying an output on such devices, it is necessary to create the sensation of multilevel colours by suitably distributing the possible output colours in the output image. By way of example, as shown in FIG. 1, it will be assumed that each pixel 1 of a first example display device is able to display red, green, blue and white colour values (RGBW), with each colour value taking a totally on or totally off state. Therefore, each colour component value can display one of two colours and the total number of colours which can be displayed by such a pixel will be 2×2×2×2=16 colours. A second illustrative example is that of a black and white raster display device wherein each pixel can display one of two colours, either black or white.

Figure 2:
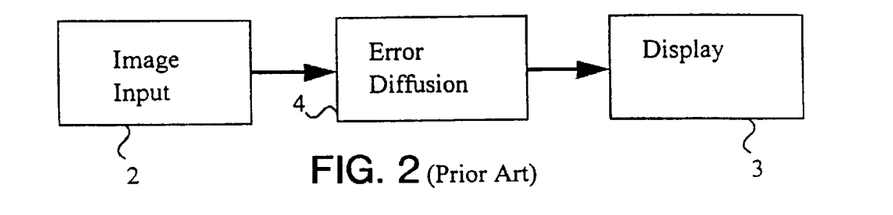
FIG. 2 is a schematic illustration of the error diffusion process as utilised in accordance with the prior art.

Referring now to FIG. 2, when it is desired to display a stored image 2 on a display 3 wherein each pixel of the display 3 can only display a restricted number of colours, it is necessary to utilise a halftoning technique such as error diffusion 4 so as to convert image 2 to be displayable on display 3.

Figure 3:
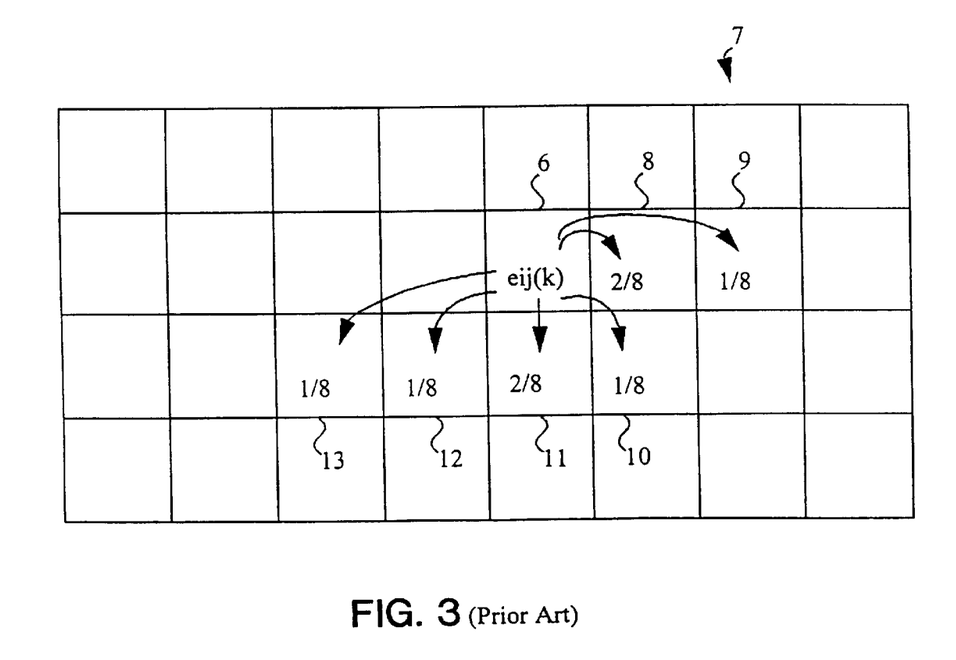
FIG. 3 illustrates the prior art error diffusion process.
Figure 4:
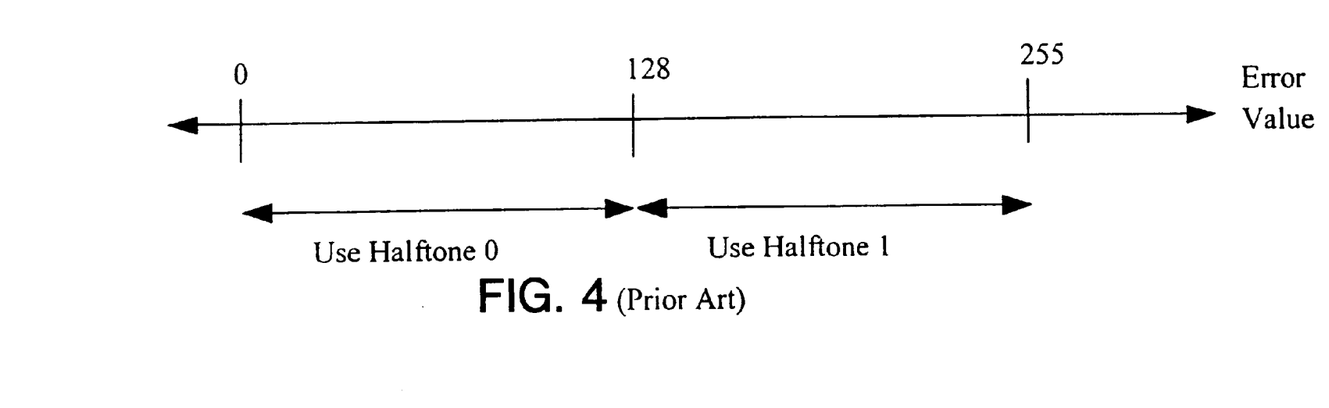
FIG. 4 illustrates the thresholding process which forms part of the prior art error diffusion process.

One well known method of halftoning is error diffusion. The traditional form of error diffusion was developed by Floyd and Steinberg and published in "An Adaptive Algorithm for Spatial Gray Scale" in Society for Information Display 1975 Symposium Digest of Technical Papers 1975 at page 36. Referring now to FIG. 3, the Floyd and Steinberg process will now be explained, initially with reference to the display of monochrome images. In a monochrome system, each pixel 6 of an array of pixels 7 can display either black or white. Assuming that the input image has 255 possible levels of display, a decision must be taken whether to display an on or off value. In standard error diffusion, as shown in FIG. 4, an output value of 0 or off is displayed when the input value is between 0 and 128 and an output value of 1 or on is displayed when the input value is between 128 and 255. In standard error diffusion, an error value for the current pixel $e_{ij}$ is derived, the error value being the difference between the input value and the chosen closest value. As illustrated in FIG. 3, portions of this error value $e_{ij}$ are then distributed amongst the surrounding pixels which have not, as yet, been output. Although it is known to have different schemes for distributing the error, FIG. 3 shows one such scheme whereby two eighths of the error is added to the value of pixel 8, one-eighth is added to the pixel 9, one eighth is added to the pixel 10, two eighths is added to the pixel 11, one eighth is added to the pixel 12 and one eighth is added to the pixel 13. This has the effect of spreading, or "diffusing", the error over several pixels in the output image. A comprehensive survey of the different aspects and variations of the error diffusion process is provided in the standard textbook by Ulichney entitled *Digital Halftoning* published in 1991 by MIT Press.

With respect to a colour output display, a first known method of error diffusion of full colour images is to error diffuse each output colour independently. Alternatively, a better method for extending error diffusion to three dimensional colour is known generally as "vector error diffusion" and is disclosed in a number of articles including (1) "Color Image Quantization for Frame Buffer Display" by Paul Heckbert, published in Computer Graphics, Volume 16, Number 3, July 1982, pages 297–304, (2) IBM Technical Disclosure Bulletin Vol. 29, No. 3, August 1986, pages 1329 to 1334, and (3) U.S. Pat. No. 5,070,413 by Sullivan et al, entitled "Color Digital Halftoning with Vector Error Diffusion".

In the vector error diffusion process, the different possible output colour values are mapped to a three dimensional colour space. The error diffusion process then proceeds by finding, for a given input value, the closest possible output value in the three dimensional colour space. A vector difference is then determined being the difference between the current input colour value and the closest possible output colour value in a three dimensional sense. This vector difference is then distributed to adjacent pixels utilising the normal Floyd and Steinberg process. With reference to the example of FIG. 1, the sixteen possible colour values of pixel 1 would be mapped into corresponding three dimensional values. Each input pixel can then be processed so as to determine the closest three dimensional value and the error distributed to adjacent pixels. This process will be further discussed hereinafter with reference to an embodiment of the present invention.

Figure 5:
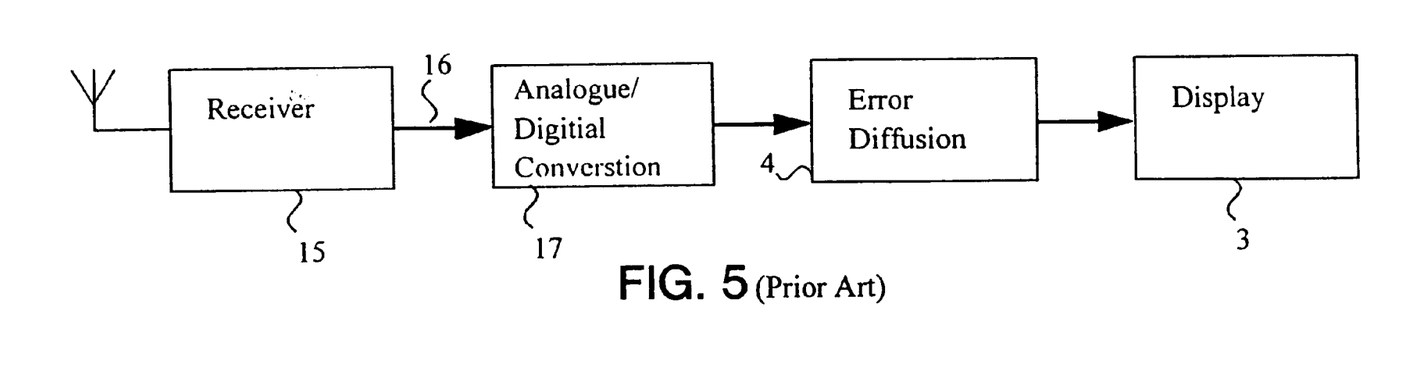

Unfortunately, it has been found that the normal error diffusion process, and three dimensional variants thereof, produce unsatisfactory results when the input image comprises video or other forms of data having motion or noise characteristics. For example, in FIG. 5, there is shown an initial arrangement for utilising a display 3, having a limited number of colours per pixel to display a television signal. One approach to such a system is to connect to a signal to a receiver 15 which is designed to filter out all signals apart from the desired television signal 16. The analog television signal 16 can then be fed to an analog to digital converter 17 where it is converted to a corresponding digital format. Unfortunately, the digital signal produced will have a certain degree of "noise" associated therewith. This image signal can then be error diffused 4 in the manner as previously described before being displayed on display 3. The television signal 16 carries images to the analog to digital converter at the normal rate, for example, 32 frames per second. Unfortunately, there is associated noise with the signal 16 which results in slight variations in the colour values of various pixels from one frame to the next. It has been found that when such a signal, with noise in it, is error diffused by error diffusion unit 4, the output of the error diffusion process is often subject to slight variations from one frame to the next which in turn results in pixel values being turned on and off at a detectible and distracting rate. This problem has been found to be particularly noticeable in regions of very slowly varying intensities and can be variously described as "sparkling noise", "dancing dots" and "twinkling". The effect produces an area having rapidly changing individual pixel values but having a substantially constant overall colour. It will be evident to those skilled in the art that the problem will apply equally to both monochrome and full colour display output devices in which video is displayed.

SUMMARY OF THE INVENTION

It is an object of the present invention to provide a form of error diffusion in which this problem is substantially alleviated.

In accordance with a first aspect of the present invention, there is provided a method of error diffusing a sequence of images, said method comprising biasing output pixels in unchanged areas of the image towards the previous output value of said output pixel.

In accordance with a second aspect of the present invention, there is provided a method of error diffusing a series of images, each of said images being made up of component pixels, said method comprising, for each of said pixels:

determining a current error diffused value for said pixel;

adding an error margin to each current error diffused value to produce a marginalised error diffused value, said marginalised error diffused value being a translation of said current error diffused value in a direction towards that of a previous output value for said pixel;

utilising said marginalised error diffused value to determine a closest possible output value to said marginalised error diffused value; and error diffusing the difference between said closest possible output value and said error diffused value to adjacent pixels.

In accordance with a third aspect of the present invention, there is provided a method of error diffusing a sequence of images, said method comprising the steps of:

error correcting an input color value of each pixel dependent on diffused error values of first surrounding pixels;

modifying one or more mappings of displayable colour values by enlarging a region of influence for a displayable colour value previously output for said corresponding pixel;

selecting from said one or more modified mappings a closest adjacent displayable colour value as an output colour value for said corresponding pixel; and distributing, a difference between said error-corrected, input colour value and said output colour value to second surrounding pixels.

In accordance with a fourth aspect of the present invention, there is provided an apparatus for error diffusing a series of images, each of said images made up of a series of pixels, said apparatus comprising:

frame buffer means for storing previous colour output values for a current pixel;

corrected error diffused value determination means for determining a corrected desired colour value for a current pixel;

marginalised output value determination means connected to both said frame buffer means and said corrected error diffused value determination means for determining a closest possible output value to said corrected desired colour value, offset by a predetermined margin in a direction towards that of said previous colour output value for said pixel; and error diffusion means connected to both said corrected error diffused value determination means and said marginalised output value determination means for determining the difference between said closest possible output value and said corrected desired colour value and for distributing said difference to adjacent pixels to form corrected desired colour values for adjacent pixels, in accordance with a predetermined error diffusion scheme.

In accordance with a fifth aspect of the invention, there is provided a method of digital halftoning a sequence of images, wherein each image comprises a plurality of pixels, said method comprising the steps of:

modifying an input colour value of a current pixel dependent upon previously calculated errors of surrounding pixels;

determining a closest adjacent displayable colour value dependent upon said error-corrected, input colour value of said current pixel;

providing an output colour value dependent upon said closest adjacent displayable colour value and an output colour value previously output for said current pixel; and determining error values for surrounding pixels of said current pixel dependent upon said error-corrected, input colour value and said output colour value for said current pixel.

In accordance with a sixth aspect of the invention, there is provided the method according to claim 11, wherein said step of determining said closest adjacent displayable colour value comprises;

modifying a map of displayable colour values for said previous output colour value by a margin M to bias selection of a displayable color value for said error-corrected, input colour value in favour of one for said output colour value previously output for said current pixel.

BRIEF DESCRIPTION OF THE DRAWINGS

The preferred embodiment of the present invention will now be described with reference to the accompanying drawings in which:

FIG. 5 is a schematic illustration of a prior art error diffusion apparatus when utilised for the error diffusion of video images or the like;

DETAILED DESCRIPTION

Figure 6:
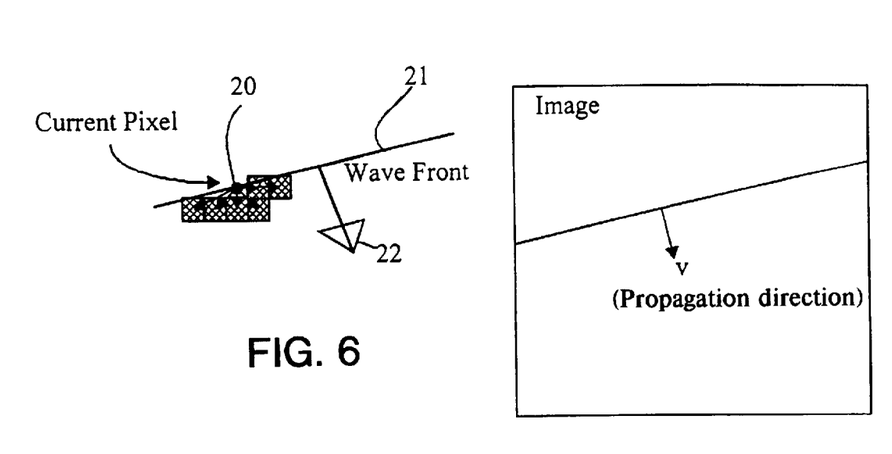
FIG. 6 illustrates the "wavefront" nature of the error diffusion process.

The preferred embodiment of the present invention has arisen as a consequence of investigation of the nature of the above mentioned "sparkling noise". It is thought that the error diffusion process propagates across a display screen or an output device as a "wavefront" at a gradient of one divided by three to the horizontal, the gradient being dependent on the particular error diffusion mask utilised. This wavefront is illustrated in the monochrome case in FIG. 6 which shows a current pixel 20 diffusing its error to adjacent pixels in accordance with the process outlined in FIG. 3. Also shown is the equivalent wave front 21 of this process. The wave front 21 has a velocity component 22 in the propagation direction.

Figure 7:
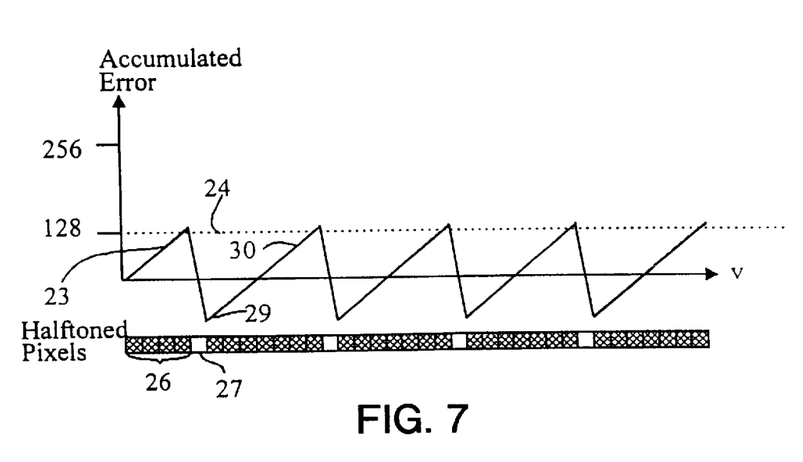
FIG. 7 illustrates the periodic nature of the error diffusion process.

As a wave front moves across a constant coloured area, or an area of slow variation in intensity, it accumulates the error of the distribution. When this error reaches a certain tolerance, a pixel will be turned on and the error reduced. This process is illustrated graphically in FIG. 7 where an error 23 is accumulated until it reaches a threshold 24. While accumulating the error the corresponding pixels 26 remain off. Once past a threshold 24 a pixel 27 is turned on. This results in the accumulated error becoming negative 29 whereupon the process is repeated 30. It should be noted that FIG. 7 illustrates a simplified example of this process in one dimension and for only a single colour and for which the intensity of the colour is of a low magnitude. As illustrated by FIG. 7, the accumulation of error and turning on of pixels exhibits a substantially periodic behaviour in regions having a slowly varying intensity. The actual period is determined by the intensity of the region. The "phase" of the periodic behaviour however, is somewhat arbitrarily determined by previous events far away in the image. The sparkling noise produced appears to be as a result of phase changes. A small change in the top of the image sets off a chain reaction which can alter the phase over the entire image. In this way, the phase is highly unstable and unavoidable noise in the input signal results in the error diffusion process producing a sparkling noise output.

In the preferred embodiment, the sparkling noise is substantially reduced by attempting to "lock" or "fix" the phase of the error distribution process so that changes in one part of the image will not change the phase in other parts of the image. One way of doing this is by biasing the choice of on or off made for a particular pixel in favour of that of the previous pixel. This has the effect of "dragging" the halftone noise signal until it lines up with the halftone noise of the previous frame. The cost of this dragging is a slight degradation of image quality.

Figure 8:
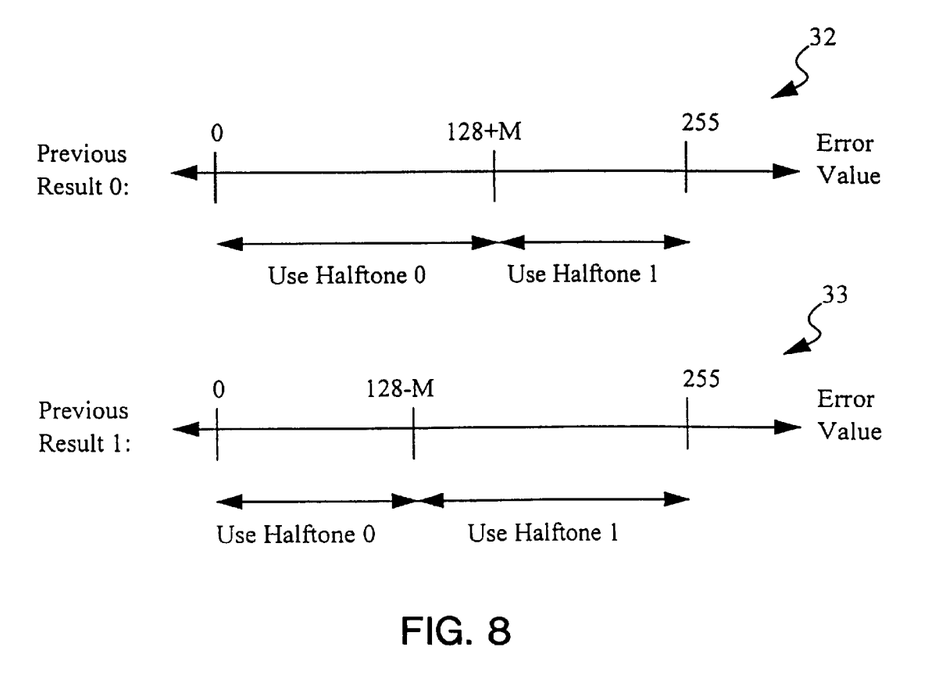
FIG. 8 illustrates the stable error diffusion process of the preferred embodiment in one dimension.

Turning now to FIG. 8, there is shown an embodiment of the process of stable error diffusion for the monochrome case. In the embodiment of FIG. 8, the threshold, which previously was stable at the value of 128, is changed depending on the previous halftone result of that pixel. In a first example 32 where the previous result for a current pixel was 0, any error diffused input values for a current pixel lying between the value 0 and 128+M are mapped to an output value of 0, or "off", and any error diffused input values in the range 128+M to 255 are mapped to an output halftone value of 1, or "on". Similarly, in a second example 33, where the previous output value for the current pixel was 1 or "on", any error diffused input values for a current pixel that lie in the range 0 to 128–M are mapped to an output value of 0 and any error diffused input values in the range of 128–M to 255 are mapped to an output value of 1.

The margin value M can be varied in accordance with the stability required in the error diffusion process. The greater the value of M, the more stable the error diffusion process will be, however the greater the resulting degradation in the image quality. Of course the value of M chosen will be dependent upon the particular noise associated with any input signal with a value of 32 found to be suitable in one particular experiment conducted by the applicant. The use of the margin value M increases the probability of choosing the same halftone value twice in a row as the margin M biases the current halftone output result to the value of the previous halftone output result.

Figure 9:
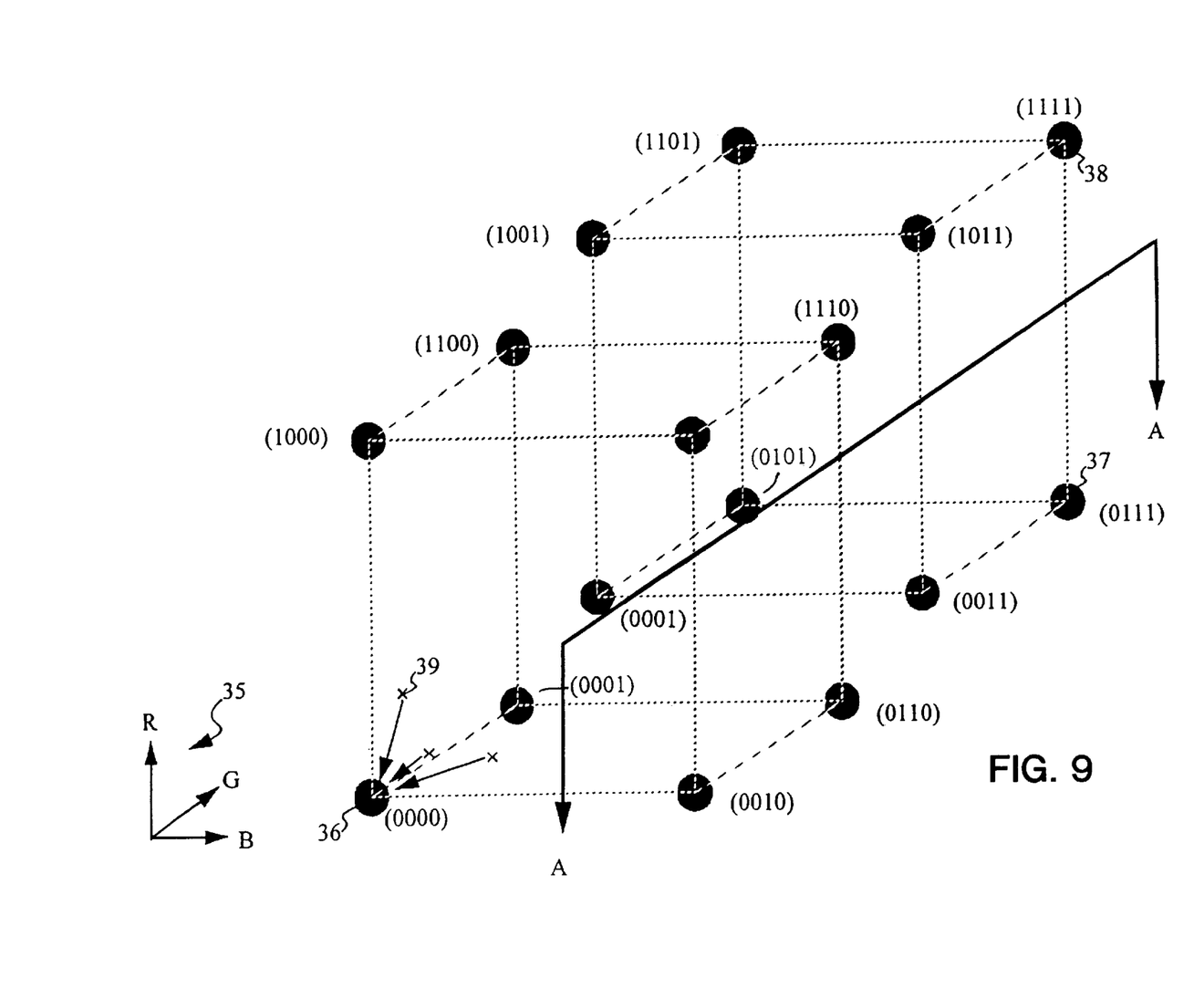
FIG. 9 illustrates the displayable output colour values of the pixel arrangement of FIG. 1, in a three dimensional colour space.

The above process of stable error diffusion can be extended to three dimensional colour. Referring now to FIG. 9, there is shown an approximate colour space representation of the possible displayable colours with the pixel arrangement of FIG. 1. The possible pixel values are plotted in a three dimensional RGB colour space 35 and comprise the 16 points e.g. 36 of possible colour output. Each of the points is indicated by an index (RGBW) which represent whether the red, green, blue and white components of the pixel are illuminated. For example, at the point 36., none of the components are illuminated and at the point 37 all the colour components apart from the red component are illuminated.

Figure 10:
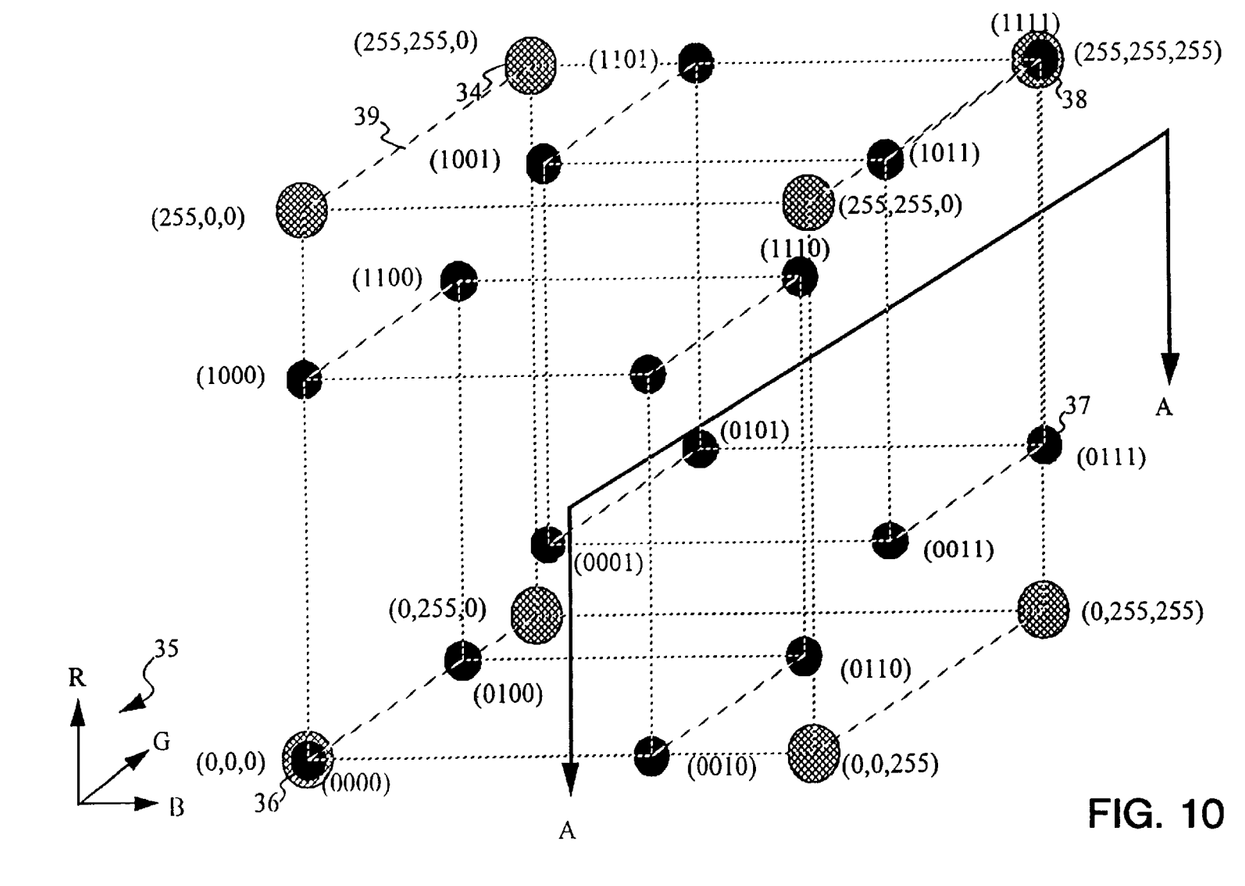
FIG. 10 illustrates the-preferred form of mapping from input colour values to output colour values in the preferred embodiment.

In the three dimensional error diffusion process discussed in the aforementioned prior published articles, the point 36 is taken to represent the location (0,0,0) of the input space representing a point having RGB components of zero magnitude. The point 38 is taken to represent the value (255, 255, 255) representing the point where each component of R, G, and B has a maximum magnitude. This process can be repeated for all combinations of the possible input values. This is illustrated schematically in FIG. 10 which shows the colour space of the input cube 39 overlaid with that of the output colour space of FIG. 9. The extremities of the input colour space e.g. the point 34 are also indicated with corresponding input component pixel values in the form of (R,G,B). For example, the point 34 will have a red component of 255, a green component of 255 and a blue component of 0.

Figure 11:
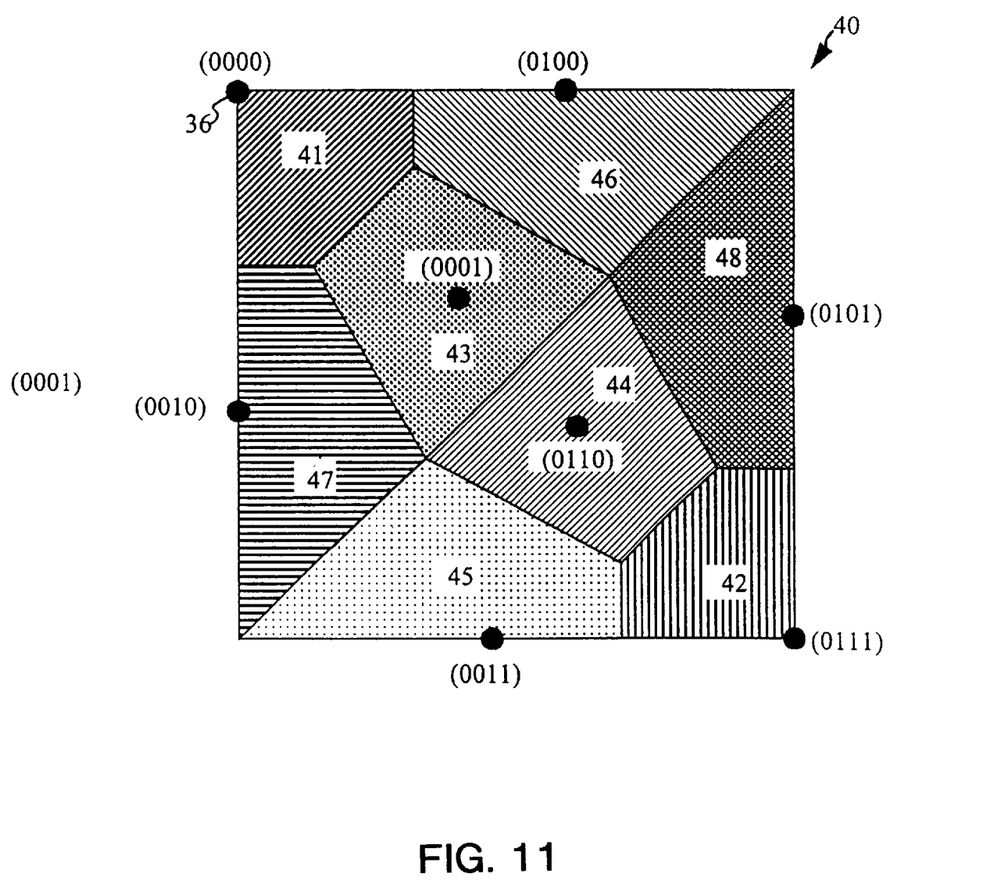
FIG. 11 illustrates graphically the corresponding input/output mapping values for a cross section through the line A—A of FIG. 10.

The other possible output colour combinations e.g. the point 37, can be measured utilising a colourimeter and compared with colourimeter measurements for the extremity output colours (e.g. 36, 38). From these measurements, a corresponding value for the point 37 can be obtained with respect to the input colour space of the input image. The next step can be to obtain, for each possible input value, the closest possible displayable point. Heckbert, in his article, goes into this process in detail and, for this reason, it is not repeated. However, by way of example, the value corresponding to the point marked at the cross 39 will be mapped to the output point 36 with the error distributed to adjacent pixels in accordance with the above technique. Hence, a table can be prepared, such that for each possible input point the closest output point is determined. The three dimensional error diffusion process can then be proceeded by utilising a lookup table in which, for a given input point, the table is accessed to find the closest output point. Once the closest output point is determined, the two points can be substracted from one another to find a difference or error measure which is then utilised to distribute to adjacent pixels. In this process, each possible output point will have a "region of influence" in which input points falling within that region are attracted to the regions output point. In three dimensions, the region of influence will be a convex polyhedron within the three dimensional lookup table. This is illustrated in FIG. 11 which illustrates a cross section of the lookup table corresponding to a cross-section as taken through the line A—A of FIG. 9. In FIG. 11 there is shown the possible output points e.g. 36 and their region of influence e.g. 41 in the two dimensional cross section. By way of example, any error diffused input value falling within the region 41 causes the output value 36 to be displayed and the error between the two values to be distributed to adjacent pixels.

Figure 12:
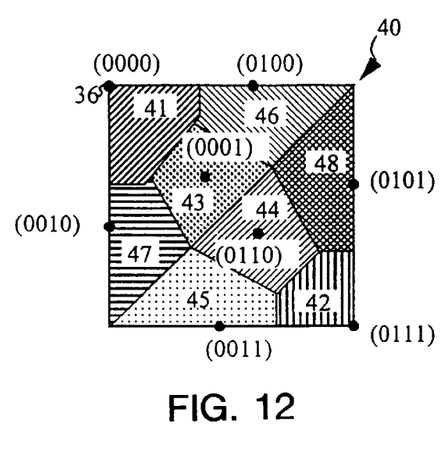
FIGS. 12–19 illustrate graphically, input/output mapping values for cross sectional views similar to FIG. 11, wherein the mapping values associated with the three dimensional colour space have been subjected to processing in accordance with the method of the preferred embodiment.
Figure 13:
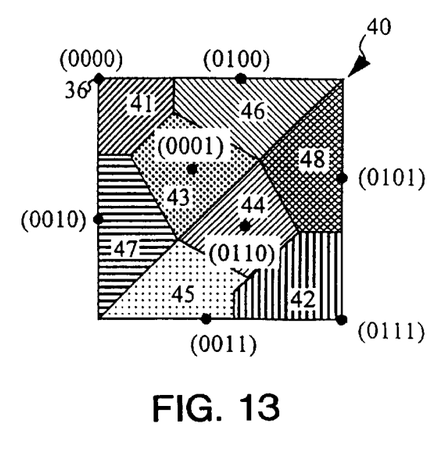
Figure 14:
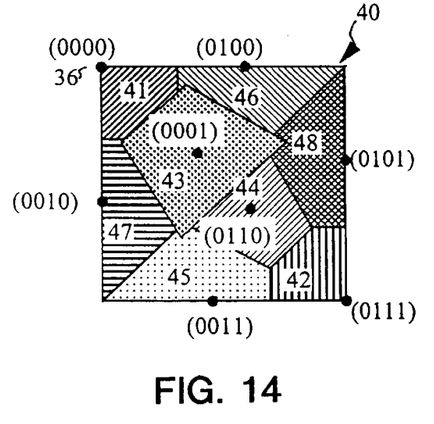
Figure 15:
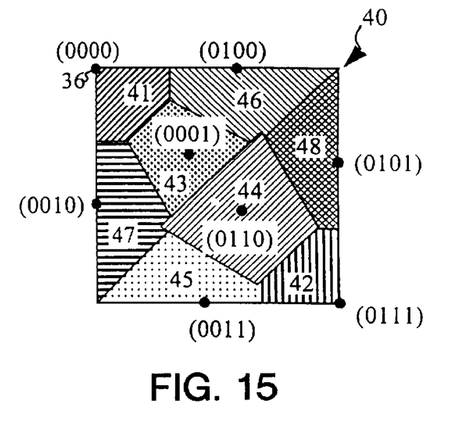
Figure 16:
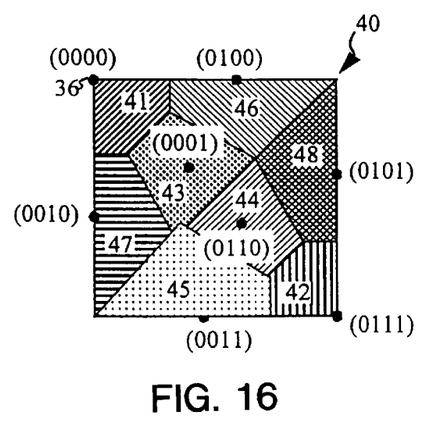
Figure 17:
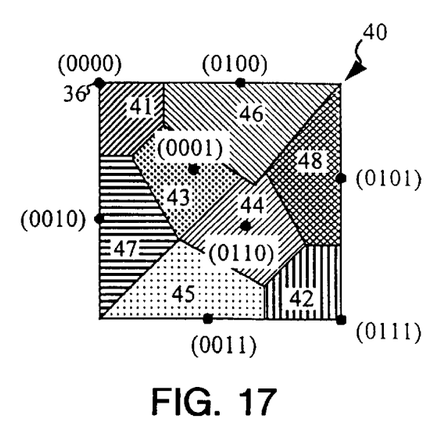
Figure 18:
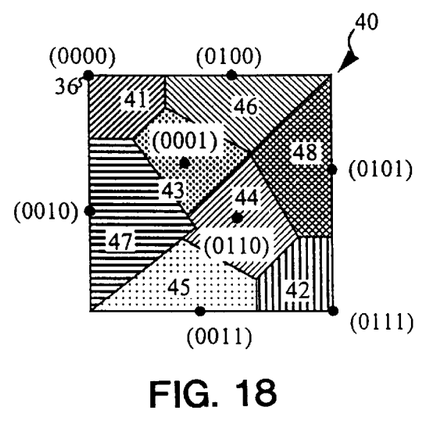
Figure 19:
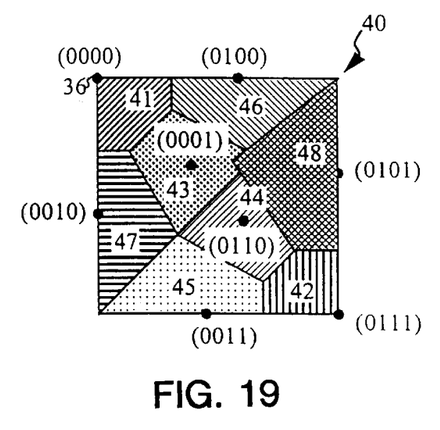

One method of extending the principles of stable error diffusion into three dimensions is to store a series of tables, one table for each possible previous output value. Therefore, for a current pixel having colour components of a certain magnitude, the table corresponding to the pixel's previous output value is utilised in accordance with the above mentioned process. Importantly, each table is subjected to processing so as to enlarge the region of influence of the region of a previous output value. By way of example, in FIGS. 12–19 there is shown an example of this enlargement process for all the regions within the table corresponding to the cross section of FIG. 11. In FIG. 12, the region 41 has been enlarged, in comparison with FIG. 11. This region can be utilised when the previous output value for the current pixel location is the output value 36. Similarly, in FIG. 13, the region 42 has been enlarged and is best utilised when the previous output value was at the point 37. This process is repeated for each table, with, for example in FIG. 14 the region 43 being enlarged, FIG. 15 the region 44 being enlarged, FIG. 16, the region 45 being enlarged, in FIG. 17 the region 46 being enlarged, FIG. 18, the region 47 being enlarged, and in FIG. 19 the region 48 being enlarged. It should of course be noted that the example given with reference to FIGS. 12–19 is one in only two dimensions and the enlargement process must in effect take place in three dimensions.

In order to integrate the above method into a display system, it is necessary to store the pixel values of a previous frame. This can be achieved utilising the traditional frame buffer techniques well known to those skilled in the art of computer graphics.

Figure 20:
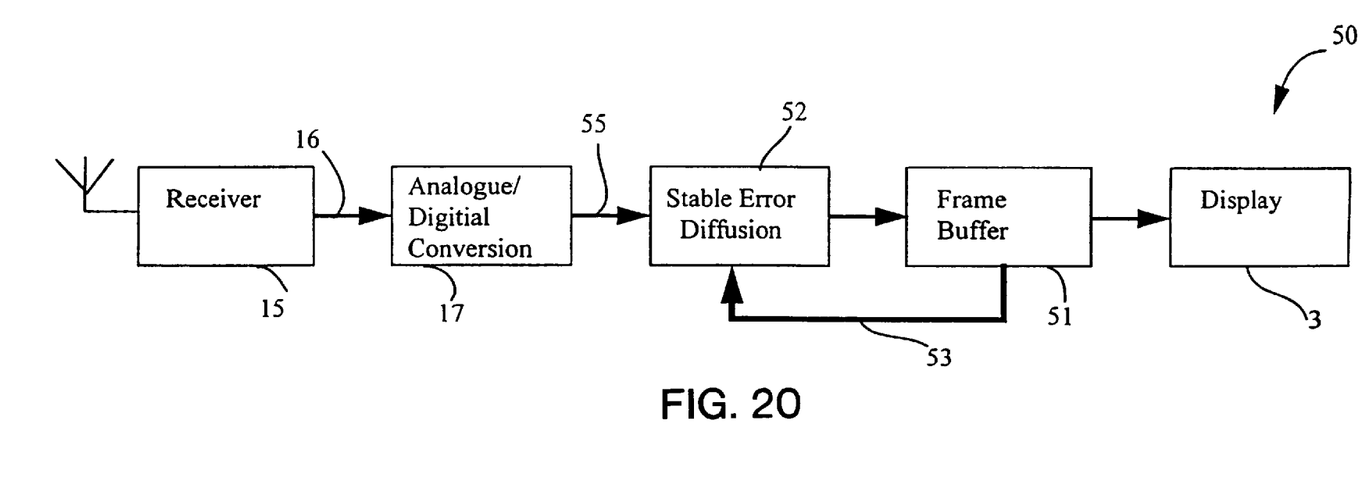
FIG. 20 illustrates an adaptation of the prior art device of FIG. 5 so as to result in a preferred apparatus which implements the method of the preferred embodiment.

Referring now to FIG. 20, there is shown an example system 50 having receiver 15, analog to digital conversion unit 17 and display 3 in the same form as that utilised in the prior art. A frame buffer 51 stores the output pixels to be displayed on display 3 in the normal manner. These pixels are output from a stable error diffusion unit 52. The output format from the stable error diffusion unit 52 can be the same as that of the error diffusion unit of FIG. 4. The stable error diffusion unit 52, in addition to reading the input pixel values 55 from analog to digital conversion unit 17, also reads pixel values 53 from frame buffer 51 for the previous output value for a current pixel in the image. As previously described, the previous pixel output read from frame buffer 51 is utilised to determine the proper lookup table for the stable error diffusion unit 52. The frame buffer 51 can be of a double buffered type. Alternatively, with the correct staging of pixels input to the frame buffer 51, pixels can be output to the display 3 and back to stable error diffusion unit 52, so that double buffering can be avoided.

Figure 21:
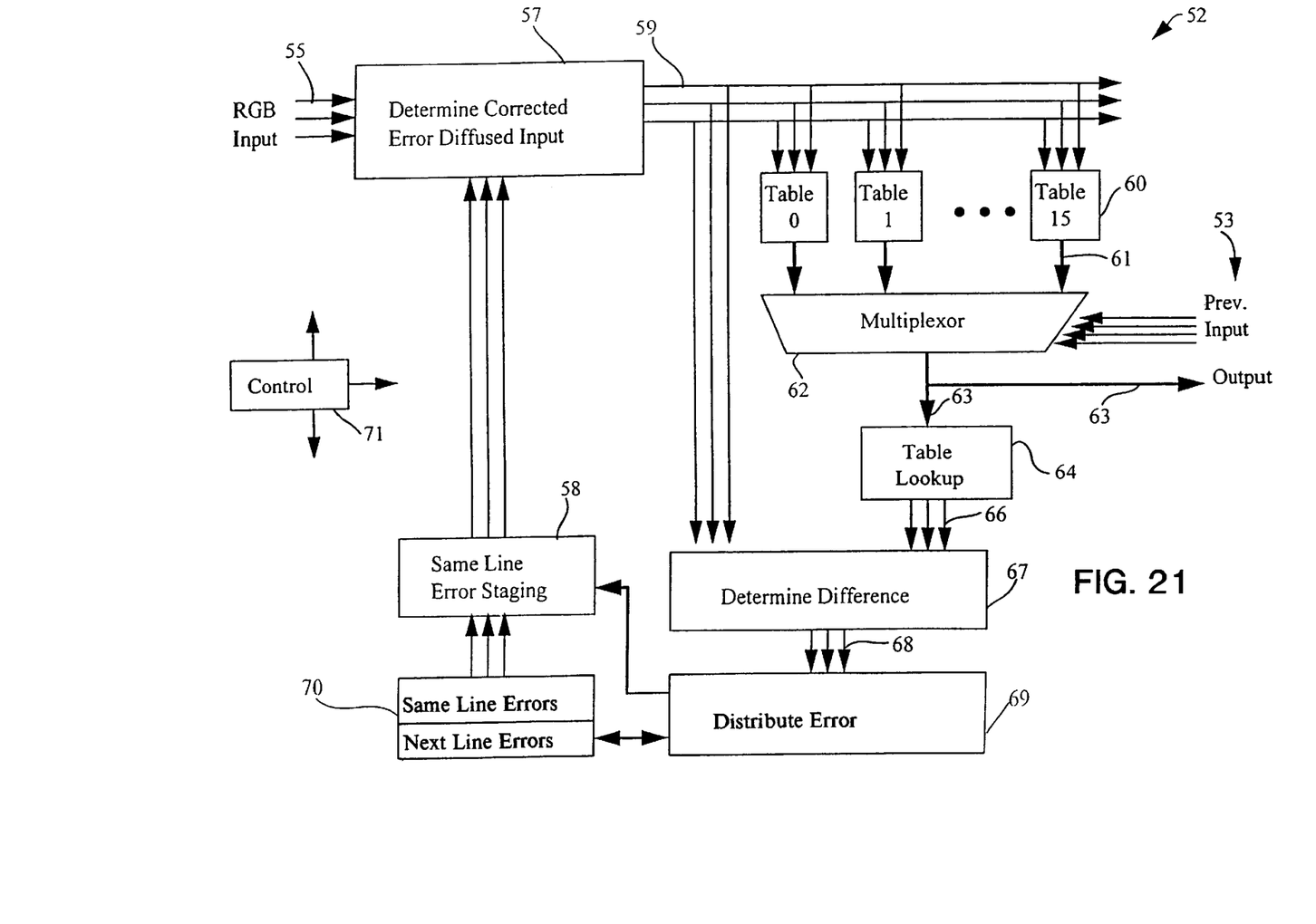
FIG. 21 is a schematic diagram of the error diffusion unit of FIG. 20.

Referring now to FIG. 21, there is shown one form of possible construction of the stable error diffusion unit 52 of FIG. 20. RGB pixel values 55 are input from the analog to digital conversion unit 17 and they are first altered by having the previously calculated surrounding errors (as will be described further hereinafter) added to them by corrected error diffusion unit 57. The corrected diffusion unit 57 merely adds those errors coming from a same line error staging unit 58. Corrected error diffused colour values 59 are output as an address to a series of tables of ROM lookups 60 which are utilised to determine the closest adjacent displayable pixels. The tables 60 are prepared in accordance with the above method as explained with reference to FIGS. 8–19. The corrected error diffusion colour values 59 are utilised as a three dimensional index into the tables e.g. 60, thereby producing a 4 bit output e.g. 61 indicative of the output pattern of a pixel format as shown in FIG. 1 corresponding to one of the 16 possible combinations of output. The outputs 61 from each of the tables 60 are fed to the inputs of a multiplexer 62. The control inputs to the multiplexer 62 comprise the previous inputs 52 read from the frame buffer 51 (FIG. 20). These control inputs are utilised to select output 63 thereby ensuring that the output 63 is derived from the table 60 prepared for pixels having a previous output of the required value.

The 4 bit output 63 is also utilised as a table lookup input to lookup table 64. The lookup table 64 converts its 4 bit input, which corresponds to a certain pattern of output colours of the pixel 1 of FIG. 1, to corresponding determined RGB components of that pixel's output luminosity. The RGB output components 66 are fed together with the corrected error diffusion colour value 59 to difference determination unit 67 which subtracts the two colour components from one another to produce an overall colour error 68 which will be the difference between the output coloured displayed 63 and the corrected error difference colour value 59. This output 68 is fed to an error distribution unit 69 which is required to distribute the error in accordance with FIG. 3. Of course, other forms of error distribution apart from those of FIG. 3 are readily envisaged by the preferred embodiment.

An error storage unit 70 is provided to store errors for both the next line and the current line. The error storage unit 70 comprises the two buffers which are swapped at the end of each line. Additionally, the next line buffer is also zeroed at the end of each line after swapping has taken place. The errors derived by distribution error unit 69 are then added to the corresponding pixel locations within the next line buffer within storage unit 70. Simultaneously, error values for the next pixel are read out of error storage unit by the same line error staging unit 58 in which are added to the corresponding previous pixels error distributed from distribution error unit 69. The final error value is then output to corrected error diffusion unit 57, to be added to the next input pixel 55 to form a new corrected error difference colour value 59.

A control unit 71 comprises a finite state machine for staging the various operations of error diffusion unit 52 and includes registers as required, such as a pixel counter and a line counter register.

The foregoing description of the stable error diffusion unit 52 is provided for simple illustrative purposes only. Those skilled in the art can recognise that the design of FIG. 21 can be substantially optimised through the provision of pipelining of the error distribution process so that many pixels can simultaneously have their errors diffused. Further, the system of FIG. 19 does not assume any bandwidth limitations which would result in a consequential alteration of the basic design of the error diffusion unit 52. As an example of one such system having bandwidth limitations, reference is made to Australian Patent Application No. 53112/94 entitled "Colour Display System", filed by the present applicant, the contents of which are hereby incorporated by cross reference.

In a refinement of the above method and apparatus, the noise characteristics of the input image and/or the analog/digital converter 17 can be measured. Often, it will be found that the noise characteristics differ for differing areas in the analog to digital conversion process. For example, it can be the case that the darker areas of an image experience less noise than the lighter or bright areas. In such a situation, the degree of expansion of the region of influence can be processed so as to be proportional to the degree of noise experienced in that area of the colour volume. The degree of expansion is best found through experimentation in conjunction with the particular display device utilised.

Additionally, it will be evident to those skilled in the art, that the present invention can be readily extended to other forms of display devices having a limited number of output colours in which it is necessary to repeatedly display error diffused images, such as in the case of the display of video data.

The foregoing describes only one embodiment of the present invention, and modifications, obvious to those skilled in the art, can be made thereto without departing from the scope of the present invention.

We claim:

1. A method of error diffusing a series of images, each of said images being made up of component pixels, said method comprising, for each of said pixels, the steps of:

determining a current error diffused value for a current pixel;

adding a predetermined error margin to said current error diffused value to produce a marginalized error diffused value, said marginalized error diffused value being a translation of said current error diffused value biased in a direction towards that of a previous output value for said current pixel, wherein said predetermined error margin is based upon an expected noise component of a color of said current pixel;

utilizing one or more lookup tables to determine a closest possible output value to said marginalized error diffused value; and error diffusing a difference between said closest possible output value and said error diffused value to adjacent pixels.

2. The method as claimed in claim 1, wherein each of said pixels has more than one color component.

3. The method as claimed in claim 2, wherein said determination of said closest possible output value comprises determining, in a three dimensional output space, the closest possible output value to said marginalized error diffusion value.

4. The method as claims in claim 1, wherein said predetermined error margin is varied substantially in accordance with an expected noise component of the color component of said pixel.

5. A method of error diffusing a sequence of images, said method comprising the steps of:

error correcting an input color value of each pixel dependent on diffused error values of first surrounding pixels;

modifying one or more mappings of displayable color values by enlarging a region of influence for a displayable color value previously output for said corresponding pixel, wherein said region of influence is enlarged by adding a predetermined error margin to each current error diffused value, wherein said predetermined error margin is based upon an expected noise component of a color of said corresponding pixel;

selecting from said one or more modified mappings a closet adjacent displayable color value as an output color value for said corresponding pixel utilizing one or more lookup tables; and distributing a difference between said error-corrected, input color value and said output color value to second surrounding pixels.

6. An apparatus for error diffusing a series of images, each of said images made up of a series of pixels, said apparatus comprising:

frame buffer means for storing previous color output values for a current pixel;

corrected error diffused value determination means for determining a corrected desired color value for a current pixel;

marginalized output value determination means connected to both said frame buffer means and said corrected error diffused value determination means for determining a closest possible output value to said corrected desired color value, offset by a predetermined margin biased in a direction towards that of said previous color output value for said pixel, and wherein said predetermined margin is based upon an expected noise component of a color of said current pixel, wherein said marginalized output value determination means includes a series of lookup tables for determining candidate closest possible output values and a table selection means to select the closest possible output value in accordance with the previous color output value of said pixel; and error diffusion means connected to both said corrected error diffused value determination means and said marginalized output value determination means for determining the difference between said closest possible output value and said corrected desired color value and for distributing said difference to adjacent pixels to form corrected desired color values for adjacent pixels, in accordance with a predetermined error diffusion scheme.

7. The apparatus as claimed in claim 6, wherein said predetermined margin is varied substantially in accordance with an expected noise component of the color value of said current pixel.

8. The apparatus as claimed in claim 7, wherein said marginalized output value determination means includes a series of lookup tables for determining candidate closest possible output values and a table selection means to select the closest possible output value in accordance with the previous color output value for said pixel.

9. A method of digital halftoning a sequence of images, wherein each image comprises a plurality of pixels, said method comprising the steps of:

modifying an input color value of a current pixel dependent upon previously calculated error values of surrounding pixels;

determining a closest adjacent display color value as an output color value dependent upon said error-corrected, input color value of said current pixel and an output color value previously output for said current pixel, wherein a mapping of displayable color values is modified deponent upon said previous output color value by a margin M to bias selection of a displayable color value for said error-corrected, input color value towards a value of one said output color value previously output for said current pixel, wherein said predetermined martin is based upon an expected noise component of a color of said current pixel; and determining error values for surrounding pixels of said current pixel dependent upon said error-corrected, input color value and said output color value for said current pixel.

10. An error diffusing apparatus for processing images comprising:

input error correction means for modifying an input color value of a current pixel dependent upon previously calculated error values of surrounding pixels to provide an error-corrected, input color value;

mapping means coupled to said input error correction means for outputting an output color value for said current pixel dependent upon said error-corrected, input color value and an output color value previously output for said current pixel wherein a threshold value is modified by said error margin which is dependent upon an expected noise component of a color component of said pixel and thus said mapping means biases said current output color value in favor of said output color value previously output for said current pixel, wherein said mapping means comprises, one or more lookup tables for providing possible displayable color values, and multiplexing means coupled to said lookup tables, wherein said operation of said multiplexing means is dependent upon said output color value previously output for said current pixel;

error distribution means coupled to said mapping means and said input correction means for distributing an error of said current pixel to surrounding pixels, wherein said error is dependent upon a difference between said error-corrected, input color value and said output color value of said current pixel; and error storage means coupled to said error distribution means and said input error correction means for storing distributed error values of said surrounding pixels.

* * * * *

UNITED STATES PATENT AND TRADEMARK OFFICE
CERTIFICATE OF CORRECTION

PATENT NO. : 5,940,541

DATED : August 17, 1999

INVENTOR(S) : ROSS ALEXANDER DONELLY

Page 1 of 2

It is certified that error appears in the above-identified patent and that said Letters Patent is hereby corrected as shown below:

COLUMN 6

Line 39, "represent" should read --represents--; and
Line 41, "36.," should read --36,--.

COLUMN 9

Line 64, "claims" should read --claimed--.

COLUMN 10

Line 13, "closet" should read --closest--; and

UNITED STATES PATENT AND TRADEMARK OFFICE
CERTIFICATE OF CORRECTION

PATENT NO.    : 5,940,541
DATED         : August 17, 1999
INVENTOR(S)   : ROSS ALEXANDER DONELLY Page 2 of 2

It is certified that error appears in the above-identified patent and that said Letters Patent is hereby corrected as shown below:

COLUMN 11

Line 6, "deponent" should read --dependent--; and
Line 11, "martin" should read --margin--.

Signed and Sealed this

First Day of August, 2000

Attest:

Q. TODD DICKINSON

Attesting Officer

Director of Patents and Trademarks